(12) United States Patent
Bouquet et al.

(10) Patent No.: US 8,912,296 B1
(45) Date of Patent: Dec. 16, 2014

(54) PROCESS FOR PREPARING POLYSTYRENE HAVING A HIGH MELT FLOW RATE

(71) Applicant: Styron Europe GmbH, Horgen (CH)

(72) Inventors: Gilbert Bouquet, Ghent (BE); Ulrich Reifert, Halle (DE); Nicolaas M. A. Hermans, Terneuzen (NL)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 14/366,803

(22) PCT Filed: Dec. 13, 2012

(86) PCT No.: PCT/EP2012/075379
§ 371 (c)(1),
(2), (4) Date: Jun. 19, 2014

(87) PCT Pub. No.: WO2013/092372
PCT Pub. Date: Jun. 27, 2013

(30) Foreign Application Priority Data

Dec. 20, 2011 (GB) .................................. 1122017.5

(51) Int. Cl.
*C08F 2/00* (2006.01)
*C08F 112/08* (2006.01)
*C08J 9/16* (2006.01)
*C08J 9/228* (2006.01)

(52) U.S. Cl.
CPC .................. *C08F 112/08* (2013.01); *C08J 9/16* (2013.01); *C08J 9/228* (2013.01); *C08J 2325/06* (2013.01)
USPC .................. 526/66; 526/346; 526/79; 521/79; 521/146

(58) Field of Classification Search
USPC .......................... 526/66, 79, 346; 521/79, 146
See application file for complete search history.

(56) References Cited

U.S. PATENT DOCUMENTS

| 5,240,993 A | 8/1993 | Aerts et al. |
| 5,650,106 A | 7/1997 | Paquet et al. |

(Continued)

FOREIGN PATENT DOCUMENTS

| DE | 19913419 A1 | 11/1998 |
| EP | 0412801 B1 | 2/1991 |

(Continued)

OTHER PUBLICATIONS

Search Report and Written Opinion for Application No.PCT/EP2012/075379 dated Jan. 21, 2013.

(Continued)

*Primary Examiner* — Kara Boyle
(74) *Attorney, Agent, or Firm* — The Dobrusin Law Firm, PC

(57) ABSTRACT

Provided is a process for preparing polystyrene having a weight average molecular weight (Mw) in the range of 120,000-160,000 g/mol, a polydispersity in the range of 4-6 and a melt flow rate of at least 40 g/10 minutes by feeding styrene into a reaction system through which the styrene passes as a component of a reaction mixture as it is polymerized, the reaction system including an initial reaction zone (100) and a downstream reaction zone (200), comprising the steps of: polymerizing styrene in the initial reaction zone to form polystyrene having a Mw of greater than 300,000 g/mol and a polydispersity in the range 1.5-2.5, 10-30 wt. % of the styrene fed to the initial reaction zone being polymerized there, —and polymerizing styrene remaining in the reaction mixture in the downstream reaction zone, a chain transfer agent being mixed with the reaction mixture at the commencement of this reaction zone and optionally at one or more additional locations within this reaction zone. The polystyrene may be used to manufacture expandable polystyrene beads or polystyrene foam board.

17 Claims, 1 Drawing Sheet

(56) References Cited

U.S. PATENT DOCUMENTS

| | | |
|---|---|---|
| 2005/0161858 A1 | 7/2005 | Chevillard et al. |
| 2006/0235130 A1* | 10/2006 | Hanner et al. ............... 524/457 |
| 2010/0125122 A1 | 5/2010 | Bouquet et al. |
| 2010/0301257 A1 | 12/2010 | Modahl et al. |

FOREIGN PATENT DOCUMENTS

| | | |
|---|---|---|
| FR | 2725996 A1 | 10/1994 |
| FR | 2725995 A1 | 4/1996 |
| JP | 63309547 A | 12/1988 |
| WO | 2005/108447 A1 | 11/2005 |
| WO | 2008/042090 A2 | 4/2008 |
| WO | 2008/042090 A3 | 4/2008 |
| WO | 2010/098900 A1 | 9/2010 |
| WO | 2011/064651 A2 | 6/2011 |

OTHER PUBLICATIONS

UK Search Report for application No. GB1122017.5 dated Mar. 28, 2012.

* cited by examiner

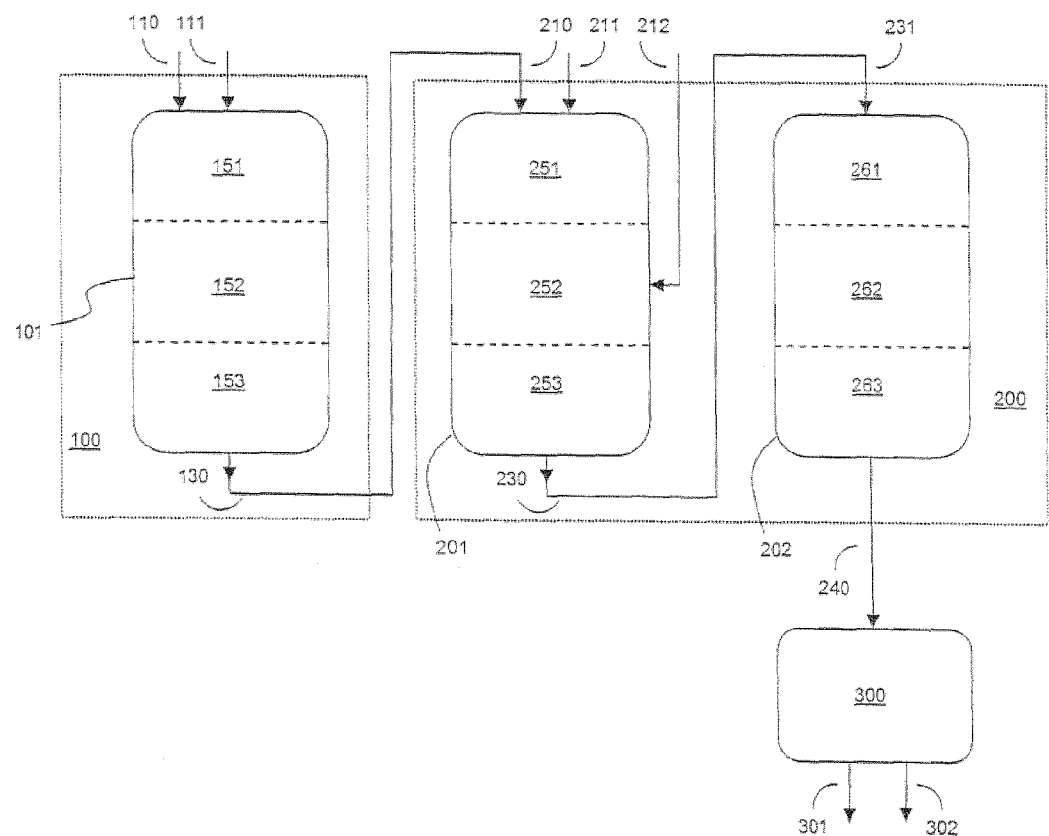

PROCESS FOR PREPARING POLYSTYRENE HAVING A HIGH MELT FLOW RATE

The present invention provides a process for preparing polystyrene having a high melt flow rate. More particularly, it relates to such a process in which a high melt flow rate polystyrene is produced by polymerizing styrene without having to blend one or more pre-formed polystyrene fractions.

U.S. Pat. No. 5,650,106 describes the production of a polystyrene foam by melting a specific polystyrene, incorporating therein a blowing agent and then cooling the resulting gel and extruding through a die to form the foam. The specific polystyrene has a weight average molecular weight of 100,000 to 250,000, a polydispersity index of 2-10 and a melt flow rate of 15-60 g/10 minutes (measured according to ASTM 1238 at 200° C. with a load of 5 kg). The use of a polystyrene having such characteristics enables the pressure drop during extrusion to be significantly reduced and can be used to form a low density foam with a large cross section. The specific polystyrene is produced by feeding a solution of a previously prepared high molecular weight polystyrene into a reactor in which an intermediate weight polystyrene is produced by polymerizing styrene such as described in U.S. Pat. No. 4,585,825. Such a process is disadvantageous because it requires a blending step and/or a step of dissolving a preformed polystyrene fraction which adds cost. Additionally, such steps can lead to undesirable side effects such as discoloration or the formation of unwanted low molecular weight polystyrene chains. Neither of these US patents teaches how to prepare polystyrene having a relatively high melt flow rate of 40 g/10 minutes or more by polymerizing styrene without the need to blend a preformed polystyrene fraction into the styrene as it is being polymerized.

In this specification:

(i) melt flow rate values are measured in accordance with ASTM 1238 at 200° C. and with a load of 5 kg;

(ii) weight average molecular weight (Mw), number average molecular weight (Mn) and z average molecular weight (Mz) are all determined by means of gel permeation chromatography (GPC) using narrow molecular weight polystyrene standards and tetrahydrofuran as a solvent. Standard integrating software is used together with a UV detector. The polydispersity of a polystyrene fraction corresponds to Mw/Mn. All molecular weights mentioned herein are in terms of g/mol; and (iii) the term "polystyrene" covers both homopolymers of styrene and copolymers of styrene consisting of at least 50% by mole repeating units of styrene together with one or more copolymerizable monomers. Preferred comonomers include unsaturated nitrile monomers such as acrylonitrile, methacrylonitrile, ethacrylonitrile and fumaronitrile; (meth)acrylate monomers such as methyl methacrylate and n-butyl acrylate; vinyl halides such as vinyl chloride and vinyl bromide; vinylidene halides such as vinylidene chloride and vinylidene bromide; vinyl esters such as vinyl acetate and vinyl propionate; ethylenically unsaturated dicarboxylic acids and anhydrides or derivatives thereof such as maleic acid, fumaric acid, maleic anhydride and dialkyl maleates or fumarates (such as dimethyl maleate, diethyl maleate, dibutyl maleate and the corresponding fumarates); and N-aryl maleimides such as N-phenyl maleimide.

According to a first aspect, the present invention provides a process for preparing polystyrene having a Mw in the range of 120,000-160,000, a polydispersity in the range of 4-6 and a melt flow rate of at least 40 g/10 minutes by feeding styrene into a reaction system through which the styrene passes as a component of a reaction mixture as it is polymerized, the reaction system including an initial reaction zone and a downstream reaction zone, comprising the steps of:

polymerizing styrene in the initial reaction zone to form polystyrene having a Mw of greater than 300,000 and a polydispersity in the range 1.5-2.5, 10-30 wt. % of the styrene fed to the initial reaction zone being polymerized there; and polymerizing styrene remaining in the reaction mixture in the downstream reaction zone, a chain transfer agent being mixed with the reaction mixture at the commencement of this reaction zone and optionally at one or more additional locations within this reaction zone.

The process of the above first aspect produces a relatively high molecular weight polystyrene fraction in the initial reaction zone. The introduction of the chain transfer agent in the downstream reaction zone results in the production of a lower molecular weight polystyrene fraction in this reaction zone in the presence of the previously produced high molecular weight fraction such that the polystyrene product of the process as a whole has a weight average molecular weight, polydispersity and melt flow rate within the target ranges.

Preferably, the temperature of the reaction mixture in the initial reaction zone is 120-135° C. and the temperature of the reaction mixture in the downstream reaction zone is 136-190° C.

Preferably, the cumulative concentration of chain transfer agent in the reaction mixture in the downstream reaction zone is 3,000-6,000 ppm.

Preferably, the styrene feed fed to the initial reaction zone comprises 2-8% by weight of an organic solvent such as ethyl benzene.

The downstream reaction zone may include multiple subzones including a zone Z1 where the chain transfer agent is added into the reaction mixture and where the temperature of the reaction mixture is 136-158° C. and a zone Z2 downstream of Z1 where no chain transfer chain is added and where the temperature of the reaction mixture is 159-190° C.

At the end of the downstream reaction zone, polystyrene having a Mw in the range of 120,000-160,000, a polydispersity in the range of 4-6 and a melt flow rate of at least 40 g/10 minutes can be separated from the reaction mixture. At least a portion of the remainder of the reaction mixture may be recycled by using it to prepare feed for the initial reaction zone. This remainder is principally composed of unreacted styrene and organic solvent. Typically 15-30% by weight of the reaction mixture which exits the downstream reaction zone can be recycled in this way.

It is preferred that no chain transfer agent is added to the initial reaction zone apart from any residual chain transfer agent present in feed prepared from the fraction of the reaction mixture recycled from the downstream reaction zone.

Preferably the polystyrene produced by the first aspect of the present invention has a number average molecular weight of 28,000-38,000 g/mol.

According to a second aspect, the present invention provides a process for manufacturing expandable polystyrene beads comprising the steps of:

(i) preparing polystyrene according to the above first aspect including separating it from the reaction mixture exiting the downstream reaction zone, (ii) feeding the polystyrene separated from the reaction mixture, whilst still molten, into an extruder where it is mixed with a blowing agent and extruding the mixture, and (iii) cutting the extruded mixture of polystyrene and blowing agent into polystyrene beads.

According to a third aspect, the present invention provides a process for manufacturing a polystyrene foam board comprising the steps of:

(i) preparing polystyrene according to the above first aspect including separating it from the reaction mixture exiting the downstream reaction zone, (ii) feeding the polystyrene separated from the reaction mixture, whilst still molten, into an extruder where it is mixed with a blowing agent, and (iii) extruding the mixture of polystyrene and blowing agent to manufacture the polystyrene foam board.

According to a further preferred aspect, polystyrene which has been separated from the reaction mixture is pelletized.

According to fourth aspect, the present invention provides a process for manufacturing expandable polystyrene beads comprising the steps of:

(i) preparing polystyrene pellets according to the preceding paragraph, (ii) feeding the polystyrene pellets into an extruder where they are mixed with a blowing agent and extruding the mixture, and (iii) cutting the extruded mixture of polystyrene and blowing agent into polystyrene beads.

According to a fifth aspect, the present invention provides a process for manufacturing a polystyrene foam board comprising:

(i) preparing polystyrene pellets according to the last but one paragraph, (ii) feeding the polystyrene pellets into an extruder where they are mixed with a blowing agent, and (iii) extruding the mixture of polystyrene and blowing agent to manufacture the polystyrene foam board.

The present invention provides a process for preparing polystyrene having a weight average molecular weight (Mw) in the range of 120,000-160,000, a polydispersity in the range of 4-6 and a melt flow rate of at least 40 g/10 minutes. Preferably the polystyrene has a weight average molecular weight in the range 140,000-150,000. Preferably the polystyrene has a polydispersity in the range of 4.5-5.5. Preferably the polystyrene has a melt flow rate of at least 45 g/10 minutes. The polystyrene is produced by polymerizing styrene and optionally one or more other polymerizable, unsaturated monomers. Such monomers may be selected from unsaturated nitrile monomers (such as acrylonitrile, methacrylonitrile and fumaronitrile), a (meth)acrylate based monomer (such as methyl methacrylate or n-butyl acrylate), vinyl halides (such as vinyl chloride and vinyl bromide), vinylidene halides (such as vinylidene chloride and vinylidene bromide), vinyl esters (such as vinyl acetate and vinyl propionate), ethylenically unsaturated dicarboxylic acids and anhydrides or derivatives thereof (such as maleic acid, fumaric acid, maleic anhydride and dialkyl maleates or fumarates (such as dimethyl maleate, diethyl maleate, dibutyl maleate and the corresponding fumarates)), and an N-aryl maleimide (such as N-phenyl maleimide). If styrene is polymerized in the presence of such other monomers, then such other monomers should constitute no more than 50 mol. % of repeating units in the polystyrene product. Preferably the polystyrene comprises at least 80 mol. % of styrene units, more preferably at least 95 mol. % of styrene units and most preferably the polystyrene is a homopolymer of styrene.

According to the process of the first aspect of the present invention, styrene and optionally other polymerizable, unsaturated monomers are fed into a reaction system through which the styrene passes as a component of a reaction mixture comprising styrene, polystyrene and optionally an organic solvent as the styrene is polymerized. The reaction system includes an initial reaction zone and a downstream reaction zone.

In the initial reaction zone, styrene is polymerized to form polystyrene having a Mw of greater than 300,000, more preferably greater than 340,000. The polystyrene formed in the initial reaction zone has a polydispersity in the range 1.5-2.5, more preferably 1.6-2.3 and most preferably 1.75-1.85. Preferably the residence time of the reaction mixture in the initial reaction zone is 30-120 minutes, more preferably 50-90 minutes and most preferably 60-80 minutes.

Of the styrene which is fed to the initial reaction zone, 10-30 wt. %, preferably 15-25 wt. %, is polymerized therein. The unreacted styrene (constituting 70-90 wt. % of the styrene fed to the initial reaction zone) is fed, together with the polystyrene formed in the initial reaction zone, as the reaction mixture to the downstream reaction zone. Preferably at least 50 wt. %, more preferably at least 75 wt. % and most preferably at least 90 wt. % of styrene fed to the downstream reaction zone is polymerized there.

The initial reaction zone may take a number of forms. Firstly it may be a single, stand alone reactor whose output is fed to a second reactor which constitutes either a part of or the whole of the downstream reaction zone. Alternatively, the initial reaction zone may simply be the initial part of a unitary reactor in which there is no physical separation or boundary between the initial reaction zone and the downstream reaction zone. As a further alternative, the initial reaction zone may be formed from two parallel, separate reactors in both of which styrene is polymerized and whose outputs are combined and fed to a third reactor which constitutes either a part of or the whole of the downstream reaction zone.

In general, a continuous mass polymerization technique is advantageously employed in the method of the present invention to prepare the target polystyrene. Preferably the polymerization is conducted in one or more substantially linear, stratified flow or so-called "plug-flow" type reactors such as described in U.S. Pat. No. 2,727,884 or alternatively in a stirred tank reactor wherein the contents of the reactor are essentially uniform throughout, which stirred tank reactor is generally employed in combination with one or more plug-flow type reactors. Alternatively, a parallel reactor set-up as taught in EP-A-0412801 may be used.

The reaction temperature in the initial reaction zone is preferably in the range 125-135° C., more preferably 122-133° C. The initial reaction zone may itself be divided into a number of reaction sub-zones of increasing temperature. Thus the initial reaction zone may have a first sub-zone where the temperature of the reaction mixture is about 122° C., a second sub-zone where the temperature of the reaction mixture is about 128° C. and a third and final sub-zone where the temperature of the reaction mixture is about 133° C. The residence time of the reaction mixture in each of these three sub-zones is preferably 10-40 minutes, more preferably 17-30 minutes and most preferably 20-27 minutes. An agitator in the form for instance of a revolving paddle may be present in the reactor forming the initial reaction zone to ensure good heat transfer through the reaction mixture.

Styrene, and optional copolymerizable monomers, is/are fed to the initial reaction zone dissolved in a suitable organic solvent such as ethyl benzene. Preferably the solution consists of 2-8% by weight of organic solvent and 92-98% by weight of polymerizable monomers dissolved in the organic solvent. A small amount such as 5-500 ppm (based on the amount of feed comprising styrene and solvent fed to the initial reaction zone per unit time), more preferably 10-100 ppm, of a suitable free radical polymerization initiator is also fed into the initial reaction zone. Examples of suitable free radical initiators include peroxide initiators such as per-esters (e.g. tertiary butyl peroxybenzoate and tertiary butyl peroxyacetate), dibenzoyl peroxide, dilauroyl peroxide, 1,1-bis tertiary butyl peroxycyclohexane, 1,1-bis tertiary butyl peroxy-3,3,5-trimethyl cyclohexane and dicumyl peroxide.

The reaction mixture resulting from the initial reaction zone is then subjected to further polymerization in the downstream reaction zone, at the commencement of which a chain transfer agent is mixed into the reaction mixture. It is possible that further amounts of chain transfer agent are mixed into the reaction mixture at one or more additional locations within the downstream reaction zone. In the case that the downstream reaction zone and at least a part of the initial reaction zone are carried out in one and the same reactor (a unitary reactor), then there may be no physical boundary between these two zones, the boundary simply corresponding to the location of the inlet line through which chain transfer agent is first fed into the unitary reactor. In a different embodiment, the initial reaction and downstream reaction zones are provided within separate reactors such that the outlet from the first reactor providing the initial reaction zone is connected to the inlet of the second reactor which provides at least the first part of the downstream reaction zone.

The chain transfer agent may be a monofunctional chain transfer agent, a polyfunctional chain transfer agent or a mixture of such agents. Preferably the chain transfer agent is a mercaptan compound. Examples of useful mercaptans include n-octyl mercaptan, p-octyl mercaptan, n-dodecyl mercaptan, t-dodecyl mercaptan, tridecyl mercaptan, tetradecyl mercaptan and hexadecyl mercaptan.

The mixing of the chain transfer agent with the reaction mixture in the downstream reaction zone results in polystyrene chains being produced having a significantly shorter length than those produced in the initial reaction zone. Sufficient chain transfer agent is added to the downstream reaction zone such that its cumulative concentration in the reaction mixture in the downstream reaction zone is 3,000-6,000 ppm. This cumulative concentration of chain transfer agent corresponds to the sum of the weight amounts of chain transfer agent added to the downstream reactor based on the weight of feed fed to the initial reaction zone per unit time. For instance, sufficient chain transfer agent is mixed with the reaction mixture at the start of the downstream reaction zone such that the reaction mixture at the start of this zone comprises 100-1,000 ppm of the chain transfer agent. Additional amounts of chain transfer agent are then added at one or more additional locations within the downstream reaction zone. For instance, sufficient chain transfer agent may be mixed with the reaction mixture at one such downstream location so that the reaction mixture comprises 4,000-4,900 ppm of chain transfer agent around that location. Preferably the residence time of the reaction mixture in the downstream reaction zone is 60-180 minutes, more preferably 90-150 minutes and most preferably 100-120 minutes.

The downstream reaction zone may take a number of different forms. In one embodiment, the downstream reaction zone may be a single separate reactor downstream from a first reactor which constitutes the initial reaction zone. In another embodiment, the initial reaction zone and downstream reaction zone are continuous and together form a single, unitary reactor.

In yet another embodiment, the downstream reaction zone is formed from two reactors connected in series, the first of which is downstream from an initial reactor which constitutes the initial reaction zone. In this case, the first reactor of the downstream reaction zone provides a first zone Z1 where the chain transfer agent is added into the reaction mixture and where the temperature of the reaction mixture is controlled to be 136-158° C. The second reactor provides a second zone Z2 downstream of Z1 where no chain transfer agent is added and where the temperature of the reaction mixture is 159-190° C. The residence time of the reaction mixture in Z1 is preferably 30-90 minutes, more preferably 45-75 minutes and most preferably 50-60 minutes. The residence time of the reaction mixture in Z2 is preferably 30-90 minutes, more preferably 45-75 minutes and most preferably 50-60 minutes. In such an embodiment, the zone Z1 may itself include a number of sub-zones whose temperatures increase in the downstream direction. Thus for instance it may be divided into three such sub-zones with respective temperatures of the reaction mixture of 140° C., 148° C. and 154° C. In this case, 200-1,000 ppm of the chain transfer agent may be added to the first of these sub-zones and 3,000-4,800 ppm of chain transfer agent may be added to the second of these sub-zones. The residence time of the reaction mixture in each of these three sub-zones is preferably 10-30 minutes, more preferably 15-25 minutes and most preferably 17-20 minutes. An agitator in the form for instance of a revolving paddle may be present in the reactor or reactors forming the downstream reaction zone in order to ensure good heat transfer through the reaction mixture and efficient mixing of the chain transfer agent into the reaction mixture.

The reactor constituting the zone Z2 may itself include a number of sub-zones whose temperatures increase in the downstream direction. Thus for instance it may be divided into three such sub-zones with respective temperatures of the reaction mixture of 164° C., 172° C. and 180° C. The residence time of the reaction mixture in each of these three sub-zones is preferably 10-30 minutes, more preferably 15-25 minutes and most preferably 17-20 minutes.

The reaction mixture at the end of the downstream reaction zone may be separated into a polystyrene product having a Mw in the range of 120,000-160,000, a polydispersity in the range of 4-6 and a melt flow rate of at least 40 g/10 minutes and a remainder fraction which principally comprises solvent and unreacted styrene. This remainder fraction may be recycled and used to make up fresh feed for feeding to the initial reaction zone. This recycled fraction constitutes around 15-30% by weight of the total weight of reaction mixture which exits the downstream reaction zone. The polystyrene product is preferably separated from the remainder fraction by means of a devolatilization system in which the reaction mixture from the downstream reaction zone is introduced into a devolatilizing chamber, and then monomer and other volatiles such as solvent are flashed off at an elevated temperature for example of 200-300° C. under vacuum and removed from the chamber. What remains in the chamber is the target polystyrene product which may be recovered as a molten mass.

It is preferred that no chain transfer agent is added to the initial reaction zone apart from any residual chain transfer agent present in recycled material. As a consequence, the concentration of chain transfer agent in the initial reaction zone should be less than 100 ppm, preferably less than 10 ppm, and most preferably less than 1 ppm. Minimising the amount of chain transfer agent in the initial reaction zone ensures that polystyrene formed there has a relatively high weight average molecular weight of greater than 300,000. If too great a concentration of chain transfer agent is present in the initial reaction zone, then this disadvantageously reduces the molecular weight of polystyrene formed there.

The polystyrene product produced by the process of the first aspect of the present invention preferably has a number average molecular weight of 28,000-38,000.

The polystyrene which is produced by the above first aspect has a number of end uses. Firstly, it may be formed into expandable polystyrene beads by feeding polystyrene separated from the reaction mixture, whilst still molten, into an extruder where it is mixed with a blowing agent such as pentane or carbon dioxide and then extruded. The extruded mixture of polystyrene and blowing agent is then cut into polystyrene beads.

Alternatively, the polystyrene may be used to manufacture a polystyrene foam board by feeding it, whilst still molten, into an extruder where it is mixed with a blowing agent such as pentane or carbon dioxide. The mixture of polystyrene and blowing agent is then extruded to manufacture the polystyrene foam board.

Alternatively, the molten polystyrene separated from the reaction mixture may be pelletized using techniques which are conventional in this field. The resulting pellets may be formed into expandable polystyrene beads by feeding them into an extruder where they are mixed with a blowing agent such as pentane or carbon dioxide and then extruded. The extruded mixture is then cut into polystyrene beads. Another use of the pellets is in the manufacture of a polystyrene foam board. Such a board may be produced by feeding the pellets into an extruder where they are mixed with a blowing agent such as pentane or carbon dioxide and then extruding the mixture to manufacture the polystyrene foam board.

A specific embodiment of the first aspect of the present invention will now be described as an Example with reference to FIG. 1 which schematically illustrates an apparatus suitable for preparing polystyrene according to this aspect. This Example is not intended to limit the scope of the present invention in any way.

EXAMPLE

The apparatus schematically illustrated in FIG. 1 was used to prepare a high melt flow rate polystyrene. The apparatus comprised an initial reaction zone 100 and a downstream reaction zone 200. The initial reaction zone is provided by a plug flow reactor 101. Feed was continuously added through inlet line 110 into the reactor 101. Polymerization initiator was continuously added into the reactor 101 through inlet line 111. The output from reactor 101 discharged through the outlet line 130 was then fed through inlet line 210 into a first reactor 201 of the downstream reaction zone. Chain transfer agent was mixed with the reaction mixture in reactor 201 by feeding it through each of inlet lines 211 and 212. The reaction mixture was discharged from the reactor 201 via outlet line 230 and was fed into a second reactor 202 of the downstream reaction zone through inlet line 231. Both first reactor 201 and second reactor 202 which together constitute the downstream reaction zone were plug flow reactors. The reaction mixture was discharged from reactor 202 via outlet line 240 and was then fed to a devolatilization unit 300 where it was separated into polystyrene product which was discharged through outlet line 302 and a remainder fraction which was discharged from the devolatilization unit through outlet line 301. This remainder fraction comprising mostly styrene and solvent was used to make up more feed for feeding into the reactor 101.

In more detail, and during the steady state of the polymerization reaction when the apparatus is running continuously with feed being added through inlet line 110 and the polystyrene product being collected from outlet line 302, a solution of 95.8% by weight of styrene dissolved in 4.2% by weight of ethyl benzene was fed into reactor 101 through inlet line 110. The initiator 1,1-di(tert-butylperoxy)cyclohexane (sold as CH-50-WO by United Initiators) was mixed with the feed in the reactor 101 by continuously feeding it through inlet line 111 at a rate such that the concentration of initiator in the reaction mixture in the first zone 151 of reactor 101 was 30 ppm. The inside of reactor 101 can be notionally divided into three successive zones 151, 152 and 153 of increasing temperature. The temperature of the reaction mixture in zone 151 was about 122° C.; the temperature of the reaction mixture in zone 152 was about 128° C. and the temperature of the reaction mixture in zone 153 was about 133° C.

The residence times of the reaction mixture in each of zones 151, 152 and 153 was about 22 minutes. The residence time of the reaction mixture in reactor 101 was about 66 minutes.

The reaction mixture product of the reactor 101 was discharged through outlet line 130 and then fed via inlet line 210 into the downstream reaction zone 200. The downstream reaction zone comprised plug flow reactors 201 and 202 connected together in series. Reactor 201 included three successive reaction zones 251, 252 and 253 where the temperature of the reaction mixture was respectively about 140° C., 148° C. and 153° C.

The chain transfer agent n-dodecyl mercaptan was added into zone 251 of reactor 201 through inlet line 211 and into zone 252 through inlet line 212. Sufficient chain transfer agent was added through line 211 such that the content of chain transfer agent in zone 251 was about 300 ppm. Sufficient chain transfer agent was added through line 212 such that its content in zone 252 was about 4,200 ppm. The residence times of the reaction mixture in each of the reaction zones 251, 252 and 253 was about 18 minutes. Thus the residence time of the reaction mixture in reactor 201 was about 54 minutes.

The reaction mixture from reactor 201 was fed via outlet line 230 and inlet line 231 into the final reactor 202. The residence time of the reaction mixture in reactor 202 was about 54 minutes. Reactor 202 includes three successive reaction zones 261, 262 and 263 where the temperature of the reaction mixture was respectively about 160° C., 162° C. and 170° C. The residence times of the reaction mixture in each of the reaction zones 261, 262 and 263 was about 18 minutes.

The reaction mixture product of the reactor 202 was discharged through outlet line 240 and then fed into a devolatilization unit 300 where it was separated according to the relative volatility of its components into two fractions. A first fraction mainly comprised of unreacted styrene and ethyl benzene as the solvent was discharged from the devolatilization unit through outlet line 301. This fraction was recycled by using it to prepare fresh feed for reactor 101. The second fraction mainly formed of the target polystyrene product was discharged as a molten form from the unit 300 through outlet line 302.

The polystyrene product separated by the devolatilization unit 300 had a weight average molecular weight of 147,000; a number average molecular weight of 30,000; a Z-average of 350,000; a polydispersity of 4.9; and a melt flow rate of 48.6 g/10 minutes.

The conversion rate of styrene fed to the initial reaction zone was 72 wt. % based upon the amount of polystyrene discharged from the devolatilization unit 300.

The polystyrene produced by the above Example may advantageously be used in the manufacture of expandable polystyrene beads or polystyrene foam board.

The invention claimed is:

1. A process for preparing polystyrene having a weight average molecular weight (Mw) in the range of 120,000-160,000, a polydispersity in the range of 4-6 and a melt flow rate of a least 40 g/10 minutes by feeding styrene into a reaction system through which the styrene passes as a component of a reaction mixture as it is polymerized, the reaction system including an initial reaction zone and a downstream reaction zone, comprising the steps of: polymerizing styrene in the initial reaction zone to form polystyrene having a Mw of greater than 300,000 and a polydispersity in the range of 1.5- to 2.5, 10- to 30 wt. % of the styrene fed to the initial reaction zone being polymerized there; and polymerizing styrene remaining in the reaction mixture in the downstream reaction zone, a chain transfer agent being mixed with the reaction mixture at the commencement of the downstream reaction zone.

2. A process according to claim 1, wherein the temperature of the reaction mixture in the initial reaction zone is 120-135° C. and the temperature of the reaction mixture in the downstream reaction zone is 135-190° C.

3. A process according to claim 1, wherein the styrene feed fed to the initial reaction zone comprises 2-8 wt. % of an organic solvent.

4. A process according to claim 3, wherein the solvent is ethylbenzene.

5. A process according to claim 1, wherein the cumulative concentration of chain transfer agent in the reaction mixture in the downstream reaction zone is 3000-6000 ppm.

6. A process according claim 1, wherein the downstream reaction zone includes multiple sub-zones including a zone Z1 where the chain transfer agent is added into the reaction mixture and where the temperature of the reaction mixture is 136-158° C. and a zone Z2 downstream of Z1 where no chain transfer agent is added and where the temperature of the reaction mixture is 159-190° C.

7. A process according to claim 1, including separating polystyrene having a Mw in the range of 120,000-160,000, a polydispersity in the range of 4-6 and a melt flow rate of at least 40 g/10 minutes from the reaction mixture exiting the downstream reaction zone and recycling at least a portion of the remainder of the reaction mixture.

8. A process according to claim 7, wherein 15-30% by weight of the reaction mixture exiting the downstream reaction zone is recycled.

9. A process according to claim 7, wherein no chain transfer agent is added to the initial reaction zone apart from any residual chain transfer agent which might be present in the reaction mixture recycled from the downstream reaction zone.

10. A process according to claim 7, wherein the polystyrene separated from the reaction mixture has a number average molecular weight (Mn) of 28,000-38,000.

11. A process according to claim 7, wherein the polystyrene separated from the reaction mixture is molten.

12. A process for manufacturing expandable polystyrene beads comprising the steps of:
(i) preparing polystyrene by a method according to claim 11, (ii) feeding the molten polystyrene separated from the reaction mixture into an extruder where it is mixed with a blowing agent and extruding the mixture, and (iii) cutting the extruded mixture of polystyrene and blowing agent into polystyrene beads.

13. A process for manufacturing a polystyrene foam board comprising the steps of;
ii) preparing polystyrene by a method according to claim 11,
(ii) feeding the molten polystyrene separated from the reaction mixture into an extruder where it is mixed with a blowing agent, and
(iii) extruding the mixture of polystyrene and blowing agent to manufacture the polystyrene foam board.

14. A process according to claim 7, wherein the polystyrene separated from the reaction mixture is formed into pellets.

15. A process for manufacturing expandable polystyrene beads comprising the steps of:
(i) preparing polystyrene pellets in accordance with the process of claim 14,
(ix) feeding the polystyrene pellets into an extruder where they are mixed with a blowing agent and extruding the mixture, and
(iii) cutting the extruded mixture of polystyrene and blowing agent into polystyrene beads.

16. A process for manufacturing a polystyrene foam board comprising the steps of:
(i) preparing polystyrene pellets in accordance with the process of claim 14,
(ii) feeding the polystyrene pellets into an extruder where they are mixed with a blowing agent, and (iii) extruding the mixture of polystyrene and blowing agent to manufacture the polystyrene foam board.

17. A process according to claim 1 wherein in the chain transfer agent is mixed at the commencement of the downstream reaction zone and at one or more additional locations within the downstream reaction zone.

* * * * *

UNITED STATES PATENT AND TRADEMARK OFFICE
CERTIFICATE OF CORRECTION

PATENT NO. : 8,912,296 B1
APPLICATION NO. : 14/366803
DATED : December 16, 2014
INVENTOR(S) : Gilbert Bouquet It is certified that error appears in the above-identified patent and that said Letters Patent is hereby corrected as shown below:

In the Claims

Column 9, Claim 2, Line 21 "135" should be "136"

Signed and Sealed this
Seventh Day of April, 2015

Michelle K. Lee
*Director of the United States Patent and Trademark Office*